July 12, 1932.  O. GLEASON ET AL  1,866,887
TRUCK CONSTRUCTION
Filed April 30, 1929   2 Sheets-Sheet 1
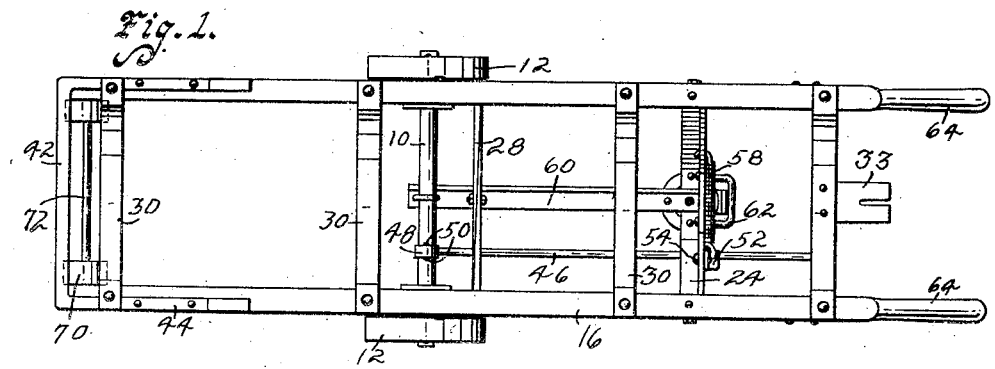
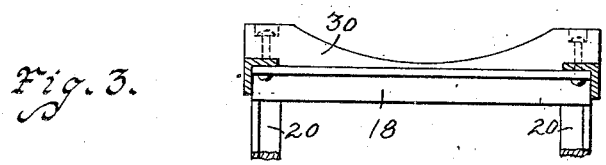
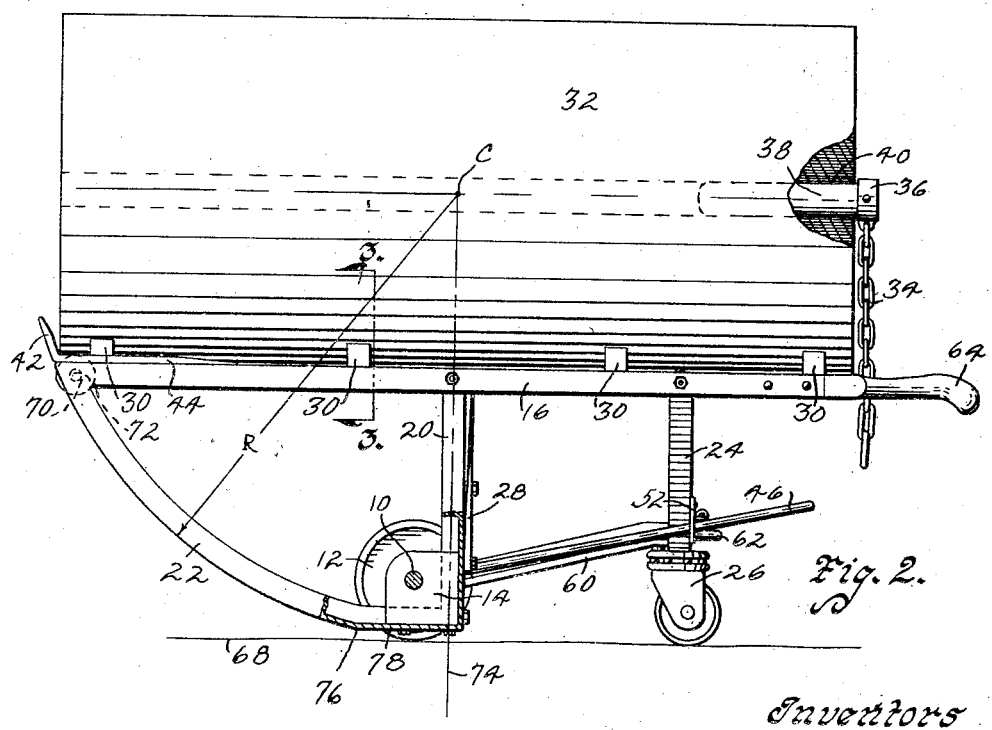
Inventors
Orville Gleason & Glen Boylan
by Bair, Freeman & Sinclair
Attorneys
Witness
Orval Floden

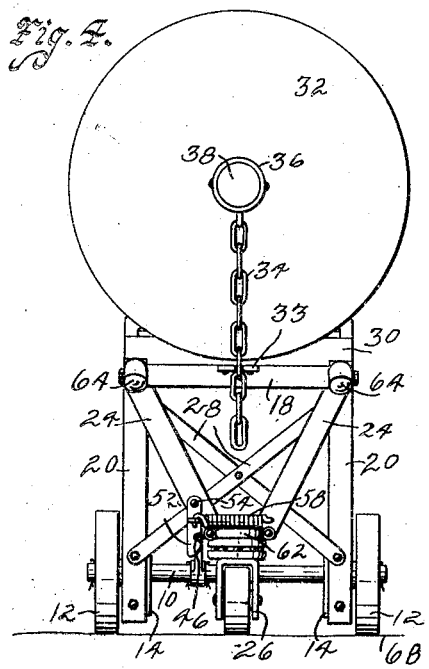
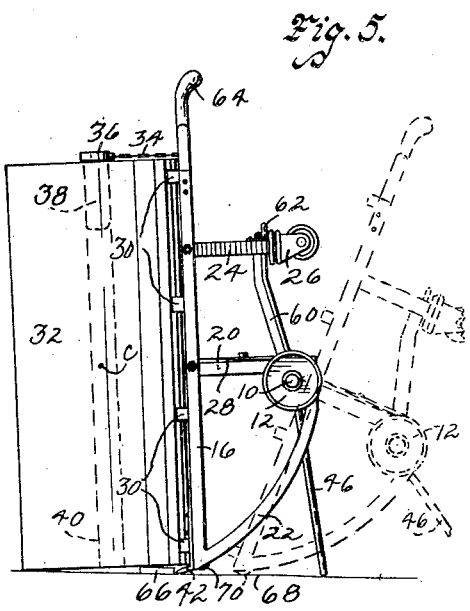
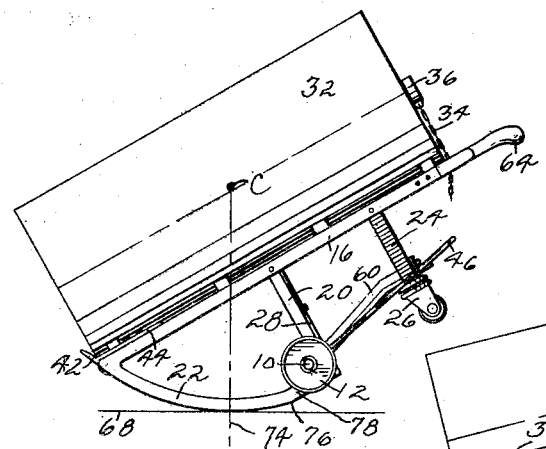
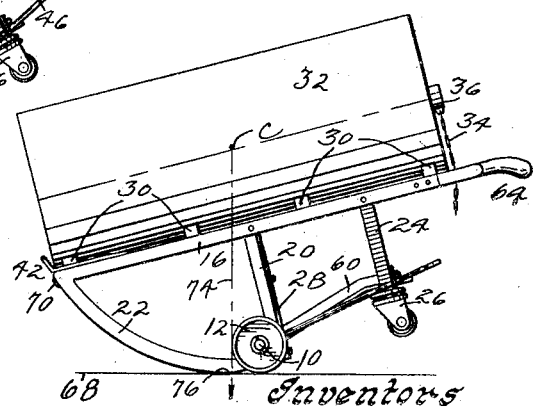

Patented July 12, 1932

1,866,887

UNITED STATES PATENT OFFICE

ORVILLE GLEASON AND GLEN BOYLAN, OF DES MOINES, IOWA, ASSIGNORS TO MEREDITH PUBLISHING COMPANY, OF DES MOINES, IOWA

TRUCK CONSTRUCTION

Application filed April 30, 1929. Serial No. 359,198.

The object of our invention is to provide a truck construction that is simple, durable and comparatively inexpensive to manufacture.

More particularly it is our object to provide a hand truck especially adapted for handling heavy loads, such as large rolls of paper used in printing establishments which sometimes weigh as much as a ton.

Still a further object is to provide such a truck adapted for transporting the loads from one place to another and adapted to be manipulated for standing the rolls on end wherever it is desired to place them.

Still a further object is to provide a truck of the character herein disclosed adapted for easy coaction with the roll, whereby the roll may be tipped from a vertical position to a horizontal position lying on the truck, the device being easily handled by one man without danger of the roll becoming unmanageable while being tipped from a vertical to a horizontal position.

More particularly it is our object to provide a rocker on the truck, curved on a radius from the center of gravity of the load (which is always of a given size and weight and of uniform consistency and therefore has a predetermined center of gravity for the particular design of truck) so that in tipping the load from a vertical to a horizontal position it may be easily rocked on the rocker, the same as rolling a large wheel, and there will be no tendency for the load to rock either one way or the other, whereby it is easily handled by the operator of the truck.

Still a further object is to provide a prop device for holding the truck on end while it is being secured to the load.

With these and other objects in view our invention consists in the construction, arrangement and combination of the various parts of our device, whereby the objects contemplated are attained, as hereinafter more fully set forth, pointed out in our claims, and illustrated in the accompanying drawings, in which:

Figure 1 is a plan view of our improved truck construction.

Figure 2 is a side elevation of the same showing a load thereon, such as a large load of paper.

Figure 3 is a sectional view on the line 3—3 of Figure 2.

Figure 4 is a rear end elevation of the truck with a roll of paper thereon; and

Figures 5, 6 and 7 are side elevations of the truck with a roll of paper thereon, showing it in different positions, as when the truck is being secured to the roll of paper, when the roll of paper is being tipped from vertical to horizontal position and where the truck is just ready to rock onto the supporting wheels thereof respectively.

On the accompanying drawings we have used the reference numeral 10 to indicate a front axle member. Supporting wheels 12 are journaled on the axle 10. The axle 10 is mounted in bearings 14.

The bearings 14 are mounted on the truck frame. The truck frame itself consists of longitudinal side members 16, a plurality of cross members 18 and an upright supporting member 20. The bearings 14 are secured to the members 20.

Extending forwardly and upwardly from the lower ends of the upright members 20 are rocker members 22. The rocker members 22 connect with the forward ends of the side members 16 and are curved in a manner hereinafter to be fully specified.

Behind the supporting members 20, we provide a V shaped leg member 24 having a caster wheel 26 mounted on the lower or apex end thereof. Suitable bracing 28 is provided for the supporting member 20. On each cross member 18 we provide a pillow block 30, adapted to fit a roll of paper 32.

Secured to the rear cross member 18 is a slotted retainer 33 adapted to receive one of the links of a chain 34. The chain 34 is secured to a band 36 which in turn is fixed to a plug 38. The plug 38 is adapted to extend into a longitudinal opening 40 in the roll of paper 32.

The forward end of the frame of the truck is provided with a lip member 42 having rearwardly extending arms 44 adapted to be secured to the side members 16. A prop is pivotally mounted on the axle 10 and has a hub 48 for encircling the axle. Pins 50 serve the purpose of retaining the hub 48 against longitudinal movement relative to the shaft 10. For supporting the outer end of the prop 46 we provide a latch 52 pivoted at 54 to the leg member 24. The latch 52 as best shown in Figure 4 is provided with a notch to receive the prop rod 46 which is cut off and shown in section in this figure. A spring 58 is employed to normally cause the prop rod 46 to be retained between the notch and the leg member 24.

In connection with the axle 10 and leg member 24 we provide a brace 60. A handle member 62 is secured to the leg member 24 and handle bars 64 are secured to the side frame members 16. The frame members 16 may be of angle bar or other suitable construction as desired. At the forward end of the truck we provide rollers 70 mounted on a shaft 72.

*Practical operation*

In the operation of our device let us assume that the roll of paper 32 is in a substantially vertical position, as shown in Figure 5, with one edge resting on a plug 66. The truck is wheeled to a position substantially close to the roll 32, and the handles 64 are then raised for causing the truck to assume a position against one side of the roll as shown. These operations are performed after the latch 52 is unlatched for allowing the rear end of the prop 46 to engage the floor 68. Upon the truck assuming the dotted line position, it may be moved along the floor 68 because of the rollers 70 being in contact with the floor. This of course, is done when the truck is too far away from the roll 32.

The prop 46 will now hold the truck in the position shown in full lines in Figure 5, so that the operator is free to insert the plug 38 in the opening 40 of the roll and hook the chain 34 in the retainer 33 as tightly as it will go. The truck is now securely positioned against the roll 32.

The prop 46 may now be raised and relatched in the latch 52 after which the handle 62 may be grasped by the operator and pulled in a direction away from the roll 32 which will cause the roll and truck to pivot on the block 66 and finally rest on the rockers 22, as shown in Figure 6. It is in this position that the necessity of the the rocker 22 being formed on a radius R from the center C of the roll is most obvious. It is the inventors' desires to provide a truck which may be easily tipped from the vertical position shown in Figure 5 to the horizontal position shown in Figure 2. Since the load will always be the same, such as a roll of paper of given size, the center of gravity C of the load will always be the same relative to the truck. Therefore, when the rocker 22 is formed on the radius R from the center of gravity of the load, the truck and the load in any position intermediate that in Figure 5 and that in Figure 7 will merely roll on the rockers 22, the same as if the rockers were the rim of a wheel. Therefore, it takes very little effort to rock the truck and its load one way or the other, and the weight of the roll 32 is not suddenly thrown on the operator when he lowers the load from vertical to horizontal position as in other types of trucks.

Since applicants' truck is used for rolls of paper it will be obvious that when a particular truck is designed for a particular roll of paper the coss bars 30 may be of the proper curvature therefor and they in conjunction with the lip member 42 will predetermine the position of the roll of paper on the truck. Since one size of truck is provided for handling a roll of paper of certain weight and size and the roll of paper or load is of uniform consistency throughout, it will be obvious that the center of gravity from which the radius for the rocker 22 is formed may be easily ascertained or predetermined, it being half-way between the ends and at the diametral center of the roll. The center of gravity, therefore, has a predetermined position with respect to the frame of the truck.

In Figures 6 and 7 the force of gravity is indicated by the line 74. The point of contact between the floor 68 and the wheel 12 is located on the arc which would be formed if the rocker 22 were extended to that point. The rocker bends inwardly at the point 76 so that clearance is provided between the rocker and the floor when the truck is in traveling position. Immediately after the center C of the load passes vertically over the point 76, the wheels 12 engage the floor 68. The load then pivots on the wheels 12 until the caster wheel 26 engages the floor 68, as shown in Figure 2.

When it is desired to rock the load from a horizontally supported position to a vertical position the latch 52 is unlatched and the handles 64 are raised causing the truck and its load to assume first the position shown in Figure 7 and then the position shown in Figure 6. The load and truck may now be given momentum enough to rock into the position shown in Figure 5 onto the block 66 by pushing upwardly on the handles 64. The chain 34 may then be unhooked from the retainer 33, the plug 38 removed, the prop 46 relatched and the truck then swung downwardly to horizontal position.

The pillow blocks 30 are designed to fit the roll 32 but our truck can be used for other loads as well as the one illustrated. By removing the pillow blocks 30, the truck can be used for boxes for instance, and a platform may be substituted for the pillow blocks if desired.

Some changes may be made in the construction and arrangement of the parts of our device without departing from the real spirit and purpose of our invention, and it is our intention to cover by our claims, any modified forms of structure or use of mechanical equivalents, which may be reasonably included within their scope.

We claim as our invention:

1. In a hand truck of the kind described, a frame, handle means at the rear end of the frame, means at the front of the frame for engaging and positioning a load on the frame, an upright support under the frame near the longitudinal center thereof, wheels on the support slightly forward with relation to such center, a support under the frame rearwardly of the first support, a rocker on the frame forwardly of the wheels extending from the forward end of the frame to the lower end of the first support and curved on the arc of a circle having its center above the frame in a line extended vertically above the first support.

2. In a hand truck of the kind described, a frame, handle means at the rear end of the frame, means at the front of the frame for engaging and positioning a load on the frame, an upright support under the frame near the longitudinal center thereof, wheels on the support slightly forward with relation to such center, a support under the frame rearwardly of the first support, a rocker on the frame forwardly of the wheels extending from the forward end of the frame to the lower end of the first support and curved on the arc of a circle having its center above the frame in a line extended vertically above the first support, and a prop pivoted to the first support and adapted to be swung to position to help support the truck when the frame is tilted to substantially upright position and to be swung to position where it may be supported on the second support out of the way of the operator.

Des Moines, Iowa, April 2, 1929.

ORVILLE GLEASON.
GLEN BOYLAN.